(12) United States Patent
Yano

(10) Patent No.: US 7,761,005 B2
(45) Date of Patent: Jul. 20, 2010

(54) RELAY FINDER OPTICAL SYSTEM OF AN SINGLE-LENS REFLEX CAMERA

(75) Inventor: Takaaki Yano, Hokkaido (JP)

(73) Assignee: Hoya Corporation, Tokyo (JP)

( * ) Notice: Subject to any disclaimer, the term of this patent is extended or adjusted under 35 U.S.C. 154(b) by 296 days.

(21) Appl. No.: 12/050,328

(22) Filed: Mar. 18, 2008

(65) Prior Publication Data

US 2008/0232791 A1 Sep. 25, 2008

(30) Foreign Application Priority Data

Mar. 20, 2007 (JP) ............................. 2007-072636

(51) Int. Cl.
  *G03B 13/02* (2006.01)
  *G03B 13/06* (2006.01)
  *G02B 15/14* (2006.01)
  *G02B 9/14* (2006.01)

(52) U.S. Cl. ................... 396/384; 396/382; 359/785; 359/788; 359/690

(58) Field of Classification Search ............... 396/382, 396/384, 379; 359/788, 690, 763

See application file for complete search history.

(56) References Cited

U.S. PATENT DOCUMENTS

| | | | | |
|---|---|---|---|---|
| 4,047,222 | A | * | 9/1977 | Moskovich et al. ......... 396/384 |
| 4,171,888 | A | * | 10/1979 | Shono et al. ................ 396/384 |
| 5,749,008 | A | * | 5/1998 | Ishihara et al. ............. 396/373 |
| 6,018,416 | A |   | 1/2000 | Mihara |
| 6,233,097 | B1 |   | 5/2001 | Mihara |
| 2001/0003495 | A1 |   | 6/2001 | Kawano et al. |

(Continued)

FOREIGN PATENT DOCUMENTS

JP 11-133298 5/1999

(Continued)

OTHER PUBLICATIONS

English language Abstract of JP 2003-121760, Apr. 23, 2003.

(Continued)

*Primary Examiner*—W. B. Perkey
*Assistant Examiner*—Noam Reisner
(74) *Attorney, Agent, or Firm*—Greenblum & Bernstein, P.L.C.

(57) ABSTRACT

A relay finder optical system, of a single-lens reflex camera, includes a condenser lens group, a prism, and a relay lens group, in this order from a primary imaging plane. An image, which is formed on the primary imaging plane, and is upside down and inverted from left to right, is re-formed on a secondary imaging plane for viewing by a photographer. The relay lens group includes a positive front lens group, a negative intermediate lens group, and a positive rear lens group, in this order from the object. The most photographers-eye side lens element of the positive rear lens group comprises a positive lens element having a convex surface facing toward the image, and satisfies the following conditions:

$$1 < SF \quad (1)$$

$$-6 < f/fM < -3 \quad (2)$$

SF: the shaping factor of the most photographers-eye side positive lens element (SF=(r1+r2)/(r1−r2)); r1: the radius of curvature of the object-side surface of the most photographers-eye side positive lens element; r2: the radius of curvature of the photographers eye-side surface of the most photographers-eye side positive lens element; f: the focal length of the relay finder optical system; and fM: the focal 25 length of the negative intermediate lens group.

5 Claims, 7 Drawing Sheets

U.S. PATENT DOCUMENTS

| | | | |
|---|---|---|---|
| 2001/0041071 A1* | 11/2001 | Sensut | 396/382 |
| 2002/0051300 A1* | 5/2002 | Mouri et al. | 359/646 |
| 2002/0136552 A1 | 9/2002 | Abe | |
| 2005/0128577 A1 | 6/2005 | Abe | |
| 2006/0023303 A1 | 2/2006 | Abe | |
| 2006/0147200 A1 | 7/2006 | Arimoto et al. | |
| 2007/0172226 A1 | 7/2007 | Nakata et al. | |

FOREIGN PATENT DOCUMENTS

| | | |
|---|---|---|
| JP | 2001-290087 | 10/2001 |
| JP | 2003-121760 | 4/2003 |

OTHER PUBLICATIONS

English language Abstract of JP 2001-290087, Oct. 19, 2001.
English language Abstract of JP 11-133298, May 21, 1999.

* cited by examiner

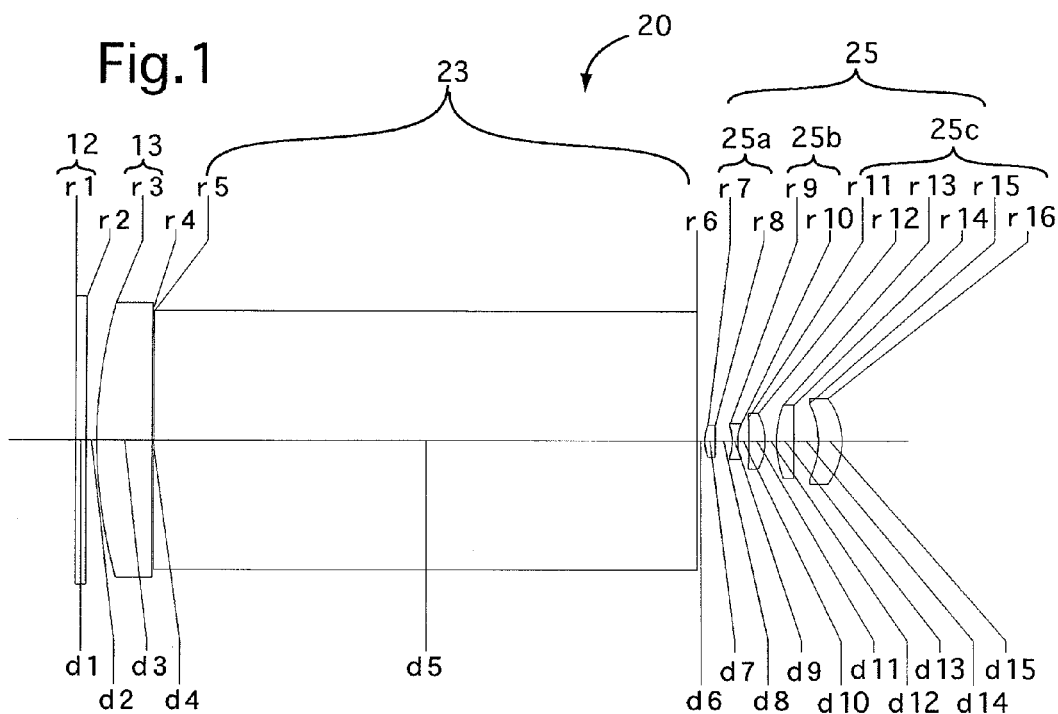
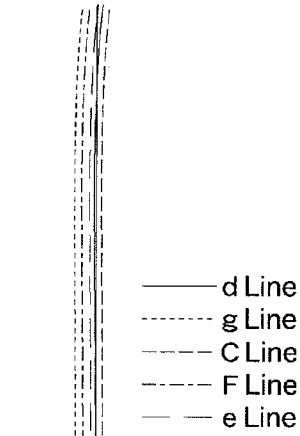
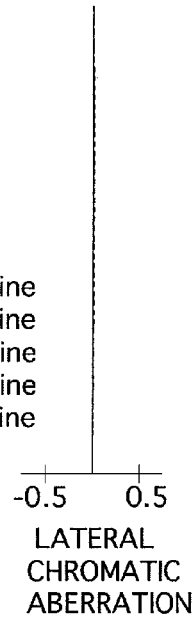
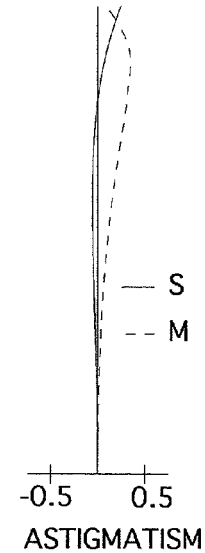
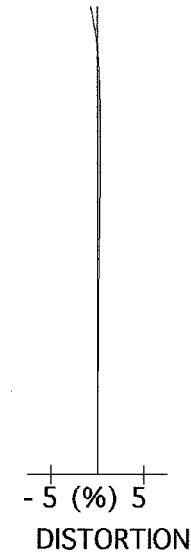

Fe= 1:3.2

— d Line
---- g Line
--- C Line
-·- F Line
-- e Line

-0.5    0.5
SPHERICAL
ABERRATION
CHROMATIC
ABERRATION

Y=6.74

-0.5    0.5
LATERAL
CHROMATIC
ABERRATION

Y=6.74

— S
-- M

-0.5    0.5
ASTIGMATISM

Y=6.74

-5 (%) 5
DISTORTION

RELAY FINDER OPTICAL SYSTEM OF AN SINGLE-LENS REFLEX CAMERA

BACKGROUND OF THE INVENTION

1. Field of the Invention

The present invention relates to a relay finder optical system of a single-lens reflex (SLR) camera.

2. Description of the Prior Art

A finder optical system of an SLR camera has a fundamental structure in which an image formed on a primary imaging plane (focusing plate) through a photographing lens system is re-formed on a secondary imaging plane through a relay finder optical system, and the secondary image is viewed by the photographer through a Lupe (magnifying) optical system (an eyepiece optical system). For example, Japanese Unexamined Patent Publication Nos. 2001-290087 and 2003-121760 can be taken as the prior art.

If an attempt is made to reduce the magnification of the relay finder optical system, the size of the secondary imaging plane can be made smaller with respect to the size of the field-of-view frame. Consequently, such a smaller magnification of the relay finder optical system contributes to further miniaturization of the camera (finder optical system).

On the other hand, in order to increase the magnification of the finder optical system, the focal length of the Lupe (magnifying) optical system is inevitably made shorter; and as a result, the eye relief becomes shorter, the diameter of the Lupe (magnifying) optical system becomes larger, and the structure of the Lupe (magnifying) optical system is complicated.

Conversely, if an attempt is made to enlarge the magnification of the relay finder optical system, not only the relay finder optical system but also the Lupe (magnifying) optical system is inevitably enlarged, so that the finder optical system (camera) cannot be miniaturized.

SUMMARY OF THE INVENTION

The present invention provides a relay finder optical system of an SLR camera, in which aberrations can be well corrected and further miniaturization can be achieved, while securing a necessary eye relief, an apparent visual angle, and a finder magnification.

According to an aspect of the present invention, there is provided a relay finder optical system, of a single-lens reflex camera, includes a condenser lens group, a prism, and a relay lens group, in this order from a primary imaging plane which is optically equivalent to an imaging plane of the single-lens reflex camera.

An image, which is formed on the primary imaging plane, and which is upside down and inverted from left to right, is re-formed on a secondary imaging plane for viewing by a photographer.

The relay lens group includes a front lens group having a positive refractive power (hereinafter, a positive front lens group), an intermediate lens group having a negative refractive power (hereinafter, a negative intermediate lens group), and a rear lens group having a positive refractive power (hereinafter, a positive rear lens group), in this order from the object.

The most photographer's-eye side lens element of the positive rear lens group includes a positive lens element having a convex surface facing toward the eyes of a photographer, and satisfies the following conditions:

$$1 < SF \quad (1)$$

$$-6 < f/fM < -3 \quad (2)$$

wherein

SF designates the shaping factor of the most photographer's-eye side positive lens element of the positive rear lens group ($SF = (r1+r2)/(r1-r2)$);

r1 designates the radius of curvature of the object-side surface of the most photographer's-eye side positive lens element of the positive rear lens group;

r2 designates the radius of curvature of the photographer's eye-side surface of the most photographer's-eye side positive lens element of the positive rear lens group;

f designates the focal length of the relay finder optical system; and fM designates the focal length of the negative intermediate lens group.

The positive rear lens group preferably includes three separate positive lens elements.

The negative intermediate lens group preferably includes a negative biconcave single lens element.

The positive front lens group preferably includes a positive single lens element.

The relay finder optical system preferably satisfies the following condition:

$$-0.35 < m < -0.25 \quad (3)$$

wherein m designates the transverse magnification of the relay finder optical system.

The present disclosure relates to subject matter contained in Japanese Patent Application No. 2007-072636 (filed on Mar. 20, 2007) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of the relay finder optical system, according to a first embodiment of the present invention;

FIGS. 2A, 2B, 2C and 2D show aberrations occurred in the lens arrangement shown in FIG. 1;

DESCRIPTION OF THE PREFERRED EMBODIMENTS

Figure 10:
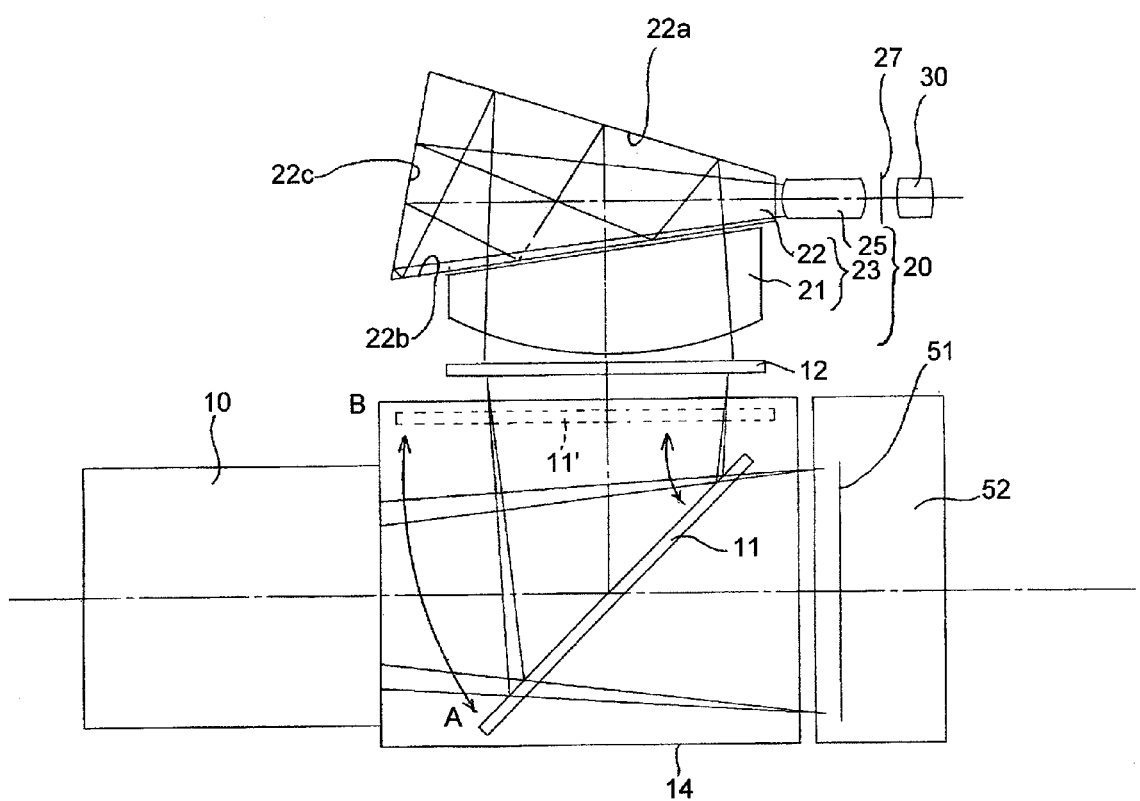
FIG. 10 shows the finder optical system of an SLR camera having the relay finder optical system according to the present invention.

FIG. 10 shows the finder optical system of an SLR camera having the relay finder optical system according to the present invention.

This SLR camera is provided with a photographing optical system 10, a main mirror 11 supported by a mirror box 14, a relay finder optical system 20, a Lupe (magnifying) optical system 30, and an imaging back 52 having an imaging device 51 installed behind the mirror box 14.

As shown in FIG. 10, the main mirror 11, i.e., a quick return mirror as employed in a known SLR camera, is arranged to stay at a photography-standby position (position A), or flips up to a photography position (a position B).

At the photography-standby position, object-carrying light rays, which are transmitted through the photographing optical system 10, are reflected by the main mirror 11 and thereafter are guided to be incident upon a focusing plate (primary imaging plane) 12 which is optically equivalent to the imaging plane of the imaging device 51 (of the SLR camera).

At the photography position, object-carrying light rays, which are transmitted through the photographing optical system 10, are incident on the imaging device 51.

The relay optical system 20 includes a condenser lens group 21, a prism (trapezoidal prism) 22, and a relay lens group 25, in this order from the focusing plate 12.

The prism 22 has a first reflection surface 22a, a second reflection surface 22b and a third reflection surface 22c; and by these reflection surfaces, the object-carrying light rays, being through the photographing optical system 10 and forming an image on the focusing plate 12, are guided to the relay lens group 25.

The image formed on the focusing plate 12 is upside down and inverted from left to right; and this inverted image is again inverted through the prism 22 and the relay lens group 25 to form an erect image, and the erect object image is re-formed on a secondary imaging plane 27. The erect image formed on the secondary imaging plane 27 is magnified by and viewed through the Lupe (magnifying) optical system 30.

The present invention relates to the relay lens group 25; and therefore the relay lens groups 25 is explained in detail in the embodiments of the present invention. On the other hand, the arrangement of the condenser lens 21, and those of the prism 22 and the eyepiece optical system 30 may have some degree of freedom on their (optical) design. Namely, the relay lens group 25 according to the present invention can be used with the condenser lens groups 21 with different specifications. The same can respectively be applied to the prisms 22 and to the Lupe (magnifying) optical systems, i.e., the relay lens group 25 can be used with the prisms 22 and the relay lens group 25 with their different specifications.

Figure 3:
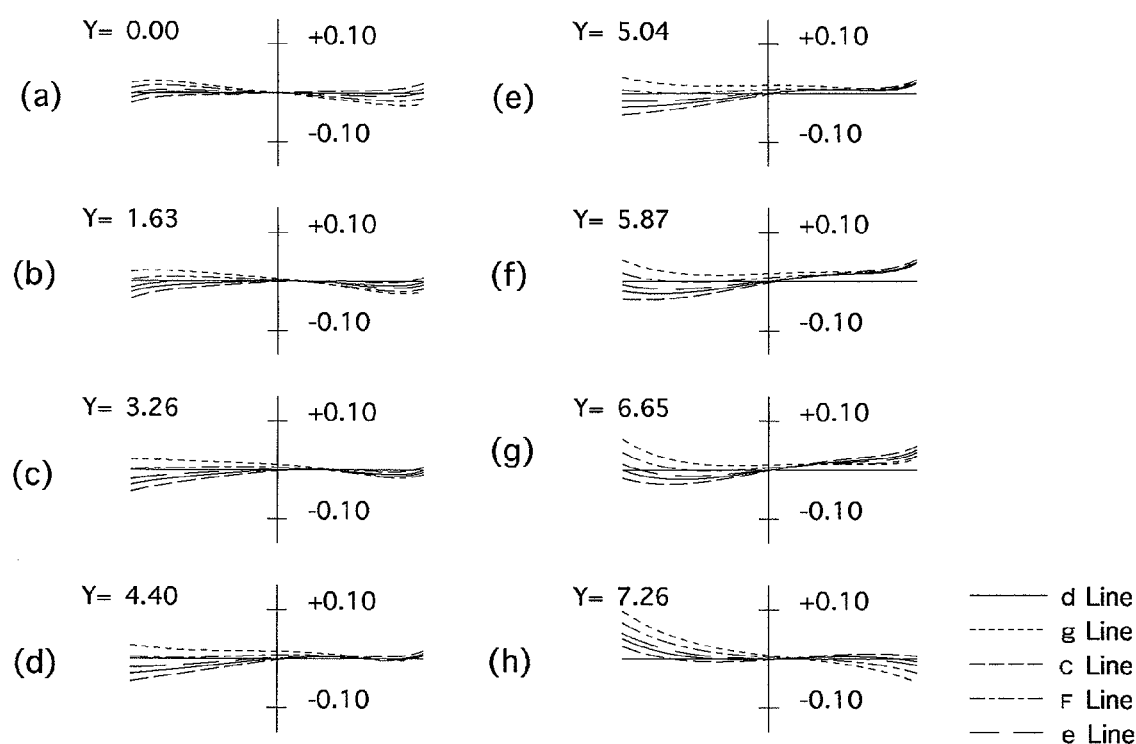
FIGS. 3A, 3B, 3C, 3D, 3E, 3F, 3G and 3H show transverse aberrations (coma) occurred in the lens arrangement shown in FIG. 1.
Figure 4:
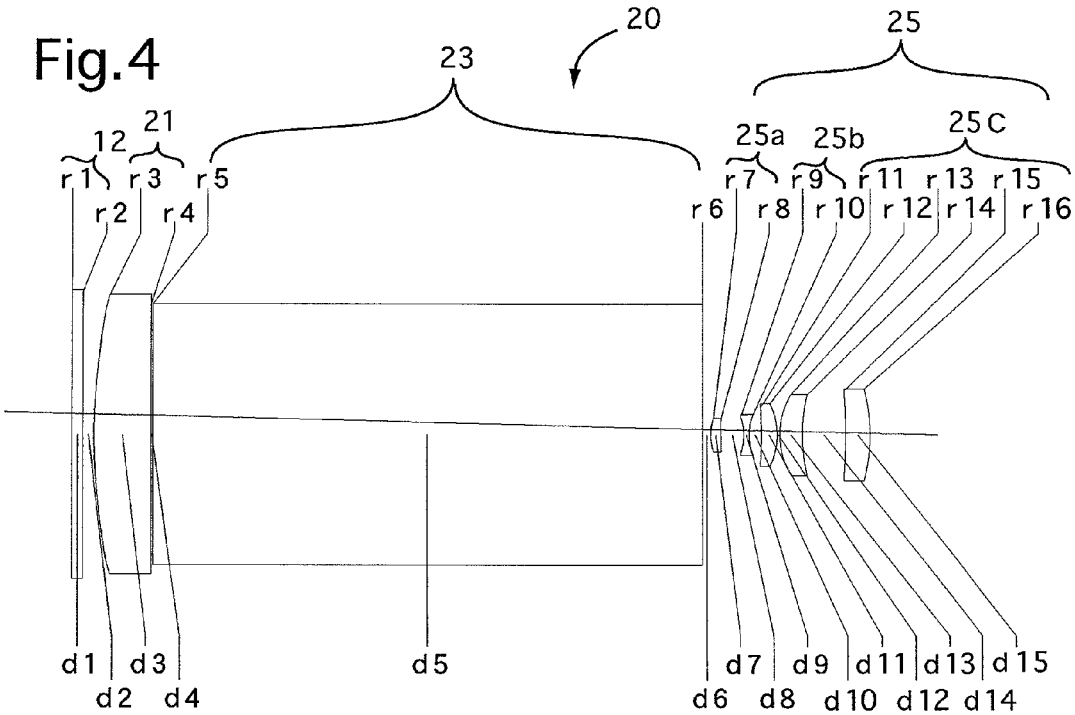
FIG. 4 is a lens arrangement of the relay finder optical system, according to a second embodiment of the present invention.
Figures 5A, 5B, 5C, 5D:
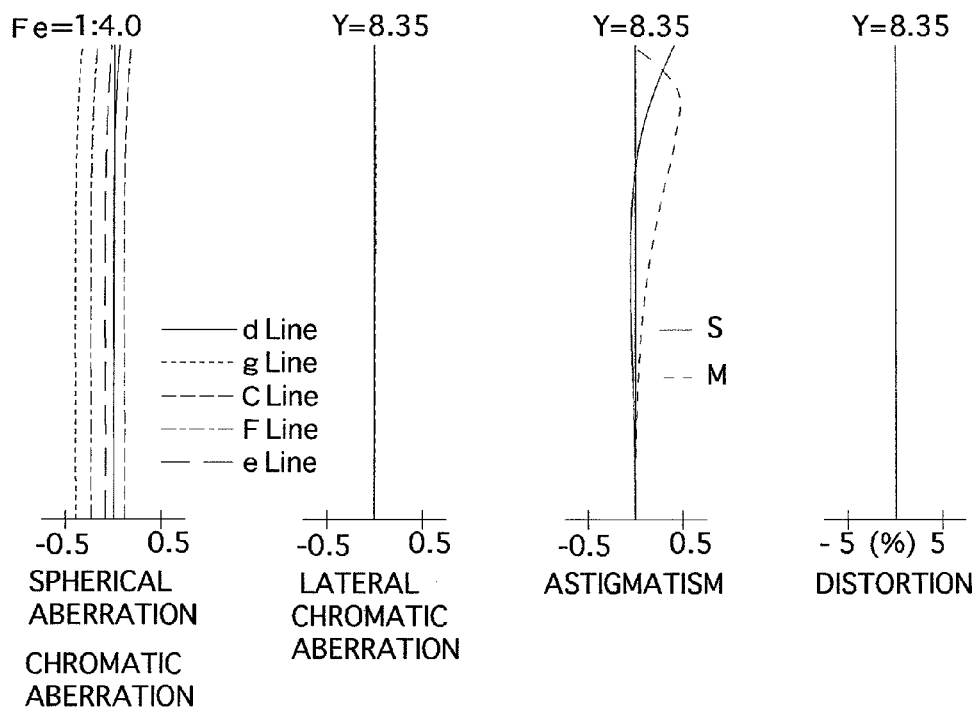
FIGS. 5A, 5B, 5C and 5D show aberrations occurred in the lens arrangement shown in FIG. 4.
Figure 6:
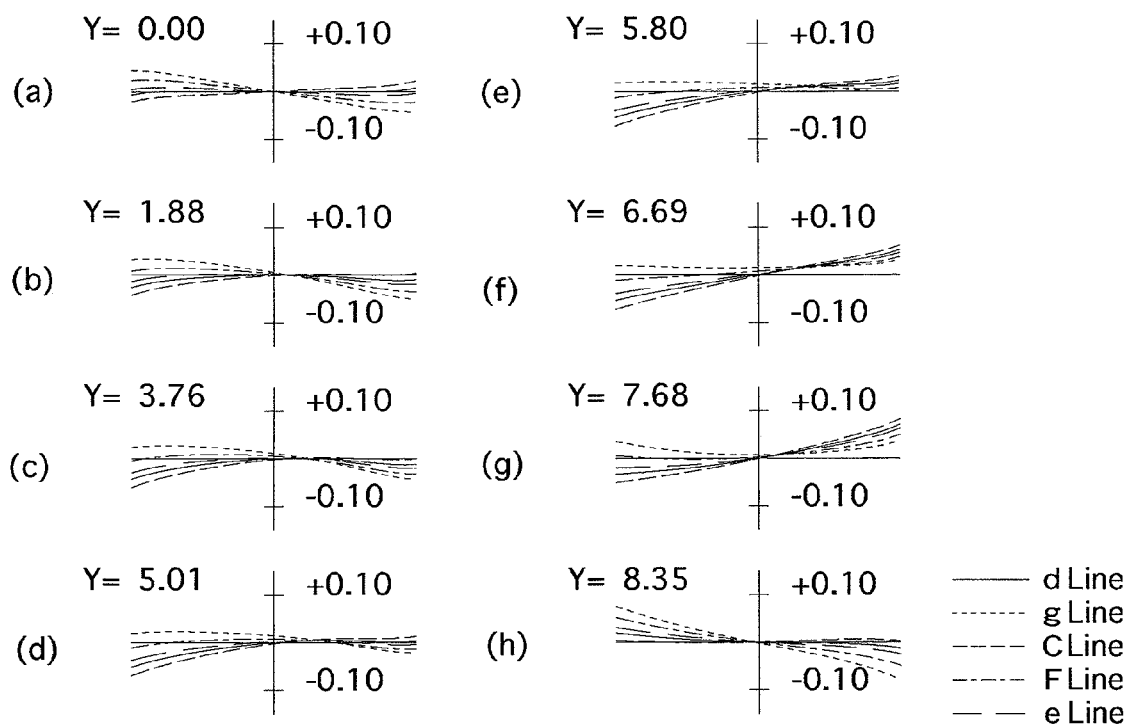
FIGS. 6A, 6B, 6C, 6D, 6E, 6F, 6G and 6H show transverse aberrations (coma) occurred in the lens arrangement shown in FIG. 4.
Figure 7:
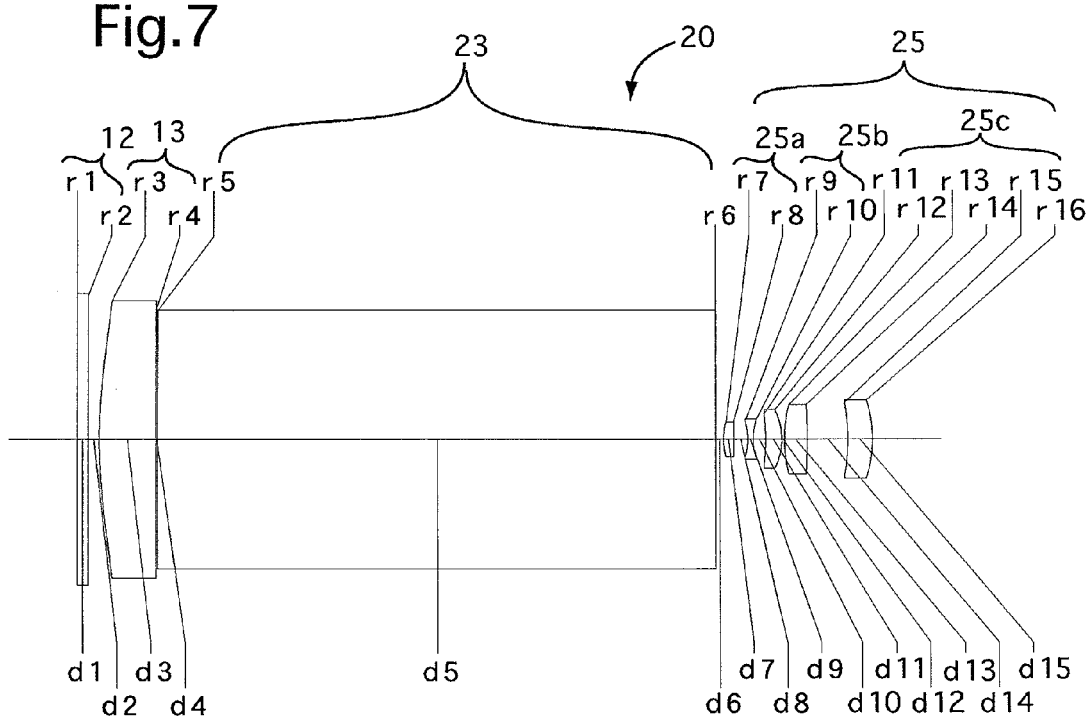
FIG. 7 is a lens arrangement of the relay finder optical system, according to a third embodiment of the present invention.
Figure 8A:
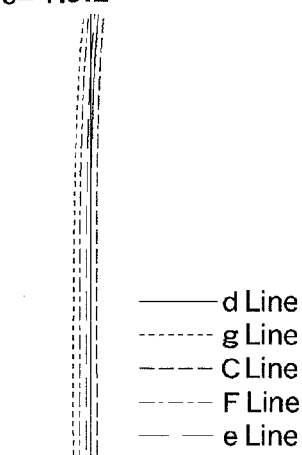
FIGS. 8A, 8B, 8C and 8D show aberrations occurred in the lens arrangement shown in FIG. 7.
Figure 8B:
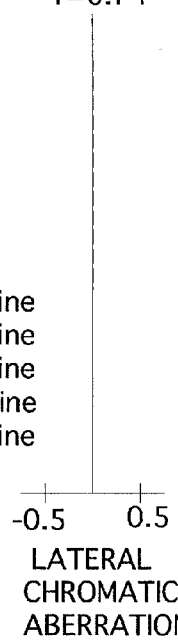
Figure 8C:
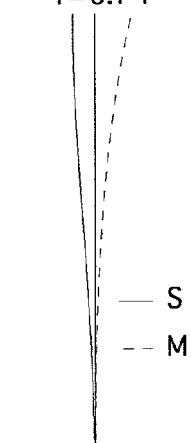
Figure 8D:
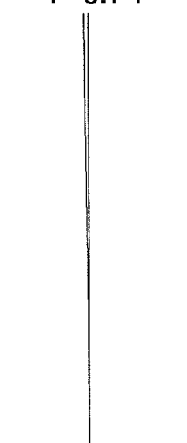
Figure 9:
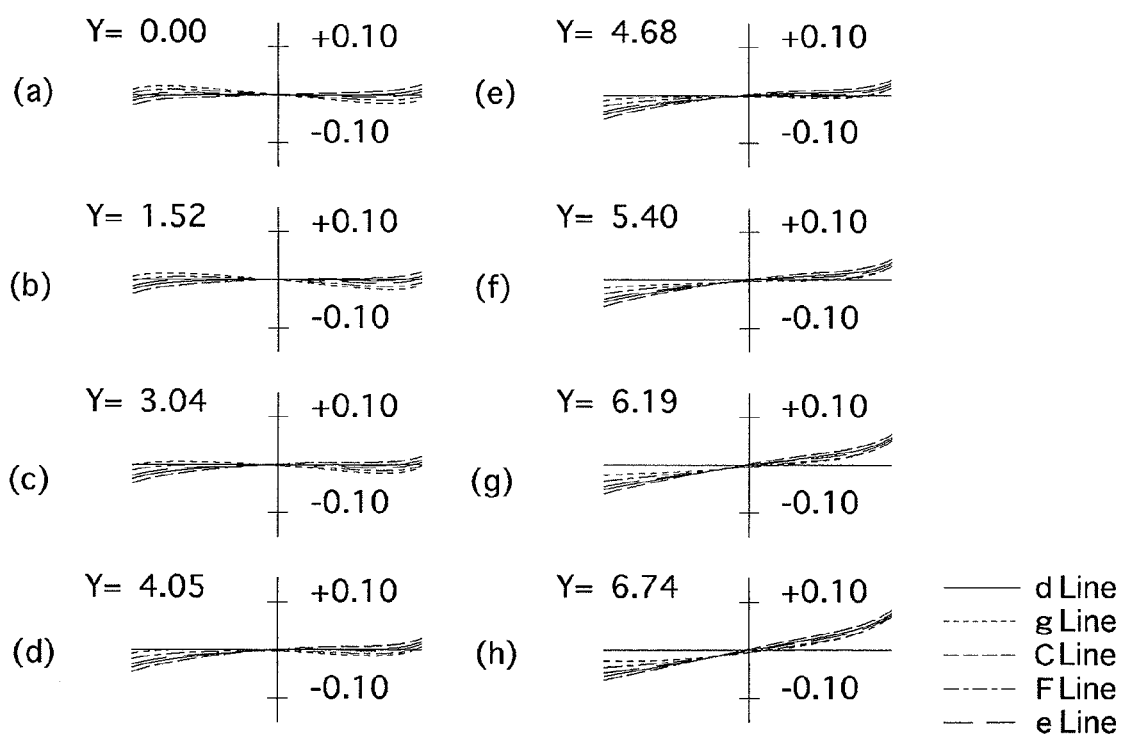
FIGS. 9A, 9B, 9C, 9D, 9E, 9F, 9G and 9H show transverse aberrations (coma) occurred in the lens arrangement shown in FIG. 9.

The relay lens group 25, as shown in FIGS. 1, 4 and 7, includes a positive front lens group 25a, a negative intermediate lens group 25b and a positive rear lens group 25c, in this order from the object.

The positive front lens group 25a includes a positive single lens element, the negative intermediate lens group 25b includes a negative biconcave single lens element, and the positive rear lens group 25c includes three separate positive lens elements.

The positive front lens group 25a can further miniaturize the relay finder optical system 20, and is arranged to correct overcorrected spherical aberration and astigmatism which are occurred in the negative intermediate lens group 25b.

The negative intermediate lens group 25b is arranged to correct field curvature and distortion.

The positive rear lens group 25c is arranged to attain telecentricity by converging the object-carrying light rays which has been diverged by the negative intermediate lens group 25b, which also contributes to further miniaturize the relay finder optical system 20.

Condition (1) specifies the shaping factor (SF=(r1+r2)/(r1−r2)) of the most photographer's-eye side positive lens element of the positive rear lens group 25c on the condition that the relay lens group 25 includes, in the order from the object, the positive front lens group 25a, the negative intermediate lens group 25b, and the positive rear lens group 25c in which the most photographer's-eye side lens element is constituted by the positive lens element having a convex surface facing toward the eyes of a photographer.

The lens element which satisfies condition (1) is a positive meniscus lens element having the convex surface facing toward the photographer's-eye.

Since the shape of the positive meniscus lens element is similar to that of an aplanatic lens element, the positive meniscus lens element is effective for the correcting of distortion while the occurrence of spherical aberration and coma is reduced.

The positive meniscus lens element satisfying condition (1) can attain telecentricity in the relay finder optical system 20, and can effectively prevent a decrease of the amount of peripheral illumination.

In the positive meniscus lens element satisfying condition (1), the principal point shifts toward the photographer's eye. Therefore the distance between the positive meniscus lens element and the secondary imaging plane 27 can be made longer. As a result, dust on a lens surface can be made less noticeable.

Furthermore, since the peripheral edge of the positive meniscus lens element is positioned closer the object from the convex surface, a larger space is secured in the vicinity of the secondary imaging plane 27, so that display components can easily be installed in the finder.

Condition (2) specifies the focal length (refractive power) of the negative intermediate lens group 25b. The negative intermediate lens group 25b is arranged to correct field curvature and distortion; however, if the focal length thereof is too short, i.e., the refractive power thereof is too strong, the correcting of aberrations becomes difficult, since the balance of the refractive power among the negative intermediate lens group 25b, the positive front lens group 25a and the positive rear lens group 25c is lost.

If the focal length of the negative intermediate lens group 25b becomes too short, i.e., the refractive power thereof becomes strong, to the extent that f/fM exceeds the lower limit of condition (2), spherical aberration is overcorrected, so that of barrel-shape distortion becomes larger. Moreover, filed curvature becomes larger in the positive direction.

If the focal length of the negative intermediate lens group 25b becomes longer, i.e., the refractive power thereof becomes weaker, to the extent that f/fM exceeds the upper limit of condition (2), spherical aberration is undercorrected, spool-shape distortion becomes larger, and field curvature is undercorrected.

Condition (3) specifies the magnification of the relay finder optical system 20 so as not to further complicate the structure thereof, and so as not to further increase the size of the camera.

If the magnification of the relay finder optical system 20 becomes higher so that m exceeds the lower limit of condition (3), the relay finder optical system 20 becomes larger. As a result, the Lupe (magnifying) optical systems 30 also becomes larger.

If the magnification of the relay finder optical system 20 becomes lower so that m exceeds the upper limit of condition (3), the relay finder optical system 20 and the camera can be miniaturized. However, due to an increase of the finder magnification, the focal length of the Lupe (magnifying) optical systems 30 is made shorter, so that the eye-relief becomes shorter. Consequently, the diameter of the Lupe (magnifying) optical systems 30 undesirably becomes larger, and the lens arrangement of the relay finder optical system 20 becomes complicated.

Specific numerical data of the embodiments will be described hereinafter.

In the diagrams of chromatic aberration (axial chromatic aberration) represented by spherical aberration, the solid line and the four types of dotted lines respectively indicate spherical aberrations with respect to the d, g, C, F and e lines.

In the diagrams of lateral chromatic aberration, y designates the image height, and the two types of dotted lines respectively indicate magnification with respect to the g and C lines; however, the d line as the base line coincides with the ordinate.

In the diagrams of astigmatism, y designates the image height, S designates the sagittal image, and M designates the meridional image.

In the diagrams of distortion, y designates the image height the secondary imaging plane 27.

In the diagrams of transverse aberrations (coma), y designates the image height the secondary imaging plane 27; and the solid line and the four types of dotted lines respectively indicate spherical aberrations with respect to the d, g, C, F and e lines.

The tables, Fe designates the effective f-number, f designates the focal length of the relay finder optical system, W designates the half angle-of-view (°), fB designates the back focal distance (the distance from the most photographer's-eye side surface of the relay finder optical system 20 to the secondary imaging plane 27), Y designates the image height at the secondary imaging plane 27, r designates the radius of curvature, d designates the lens-element thickness or a distance between lens elements (lens groups) which is variable upon zooming, $N_d$ designates the refractive index of the d-line, and v designates the Abbe number.

In addition to the above, an aspherical surface which is symmetrical with respect to the optical axis is defined as follows:

$$x = cy^2/[1+\{1-(1+K)c^2y^2\}^{1/2}] + A4y^4 + A6y^6 + A8y^8 + A10y^{10}$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

Note that the Lupe (magnifying) optical systems disclosed in Japanese Unexamined Patent Publication Nos. 2001-290087 and 2003-121760 to the present invention.

Embodiment 1

FIG. 1 is the lens arrangement of the relay finder optical system according to the first embodiment of the present invention. FIGS. 2A through 2D show aberrations occurred in the lens arrangement shown in FIG. 1. FIGS. 3A through 3H show transverse aberrations (coma) occurred in the lens arrangement shown in FIG. 1.

Table 1 shows the numerical data of the first embodiment.

Furthermore, surface No. 1 designates the primary imaging plane 12.

TABLE 1

Fe = 1:3.6
f = 34.25
M = −0.27
fB = 5.00

| Surf. No. | r | d | Nd | v |
|---|---|---|---|---|
| 2 | ∞ | 2.00 | — | — |
| 3* | 90.000 | 10.50 | 1.49176 | 57.4 |
| 4 | ∞ | 0.30 | — | — |
| 5 | ∞ | 102.08 | 1.51633 | 64.1 |
| 6 | ∞ | 1.50 | — | — |
| 7 | 8.064 | 1.90 | 1.77250 | 49.6 |
| 8 | 8898.416 | 3.20 | — | — |
| 9 | −9.100 | 1.00 | 1.69895 | 30.1 |
| 10 | 8.421 | 2.14 | — | — |
| 11 | −104.222 | 3.00 | 1.77250 | 49.6 |
| 12 | −10.801 | 2.17 | — | — |
| 13 | 19.675 | 3.20 | 1.69350 | 53.2 |
| 14 | 526.281 | 4.68 | — | — |
| 15 | −15.611 | 4.50 | 1.77250 | 49.6 |
| 16 | −13.119 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 |
|---|---|---|---|
| 3 | 0.00 | −0.18272 × 10⁻⁶ | −0.37468 × 10⁻⁹ |

Embodiment 2

FIG. 4 is the lens arrangement of the relay finder optical system according to the second embodiment of the present invention. FIGS. 5A through 5D show aberrations occurred in the lens arrangement shown in FIG. 4. FIGS. 6A through 6H show transverse aberrations (coma) occurred in the lens arrangement shown in FIG. 4.

Table 2 shows the numerical data of the second embodiment.

Furthermore, surface No. 1 designates the primary imaging plane 12.

TABLE 2

Fe = 1:4.0
f = 35.39
M = −0.31
fB = 4.9

| Surf. No. | r | d | Nd | v |
|---|---|---|---|---|
| 1 | ∞ | 2.00 | 1.49176 | 57.4 |
| 2 | ∞ | 2.00 | — | — |
| 3* | 90.000 | 10.50 | 1.49176 | 57.4 |
| 4 | ∞ | 0.30 | — | — |
| 5 | ∞ | 102.08 | 1.51633 | 64.1 |
| 6 | ∞ | 1.50 | — | — |
| 7 | 9.083 | 1.90 | 1.77250 | 49.6 |
| 8 | 77.063 | 4.27 | — | — |

TABLE 2-continued

Fe = 1:4.0
f = 35.39
M = −0.31
fB = 4.9

| Surf. No. | r | d | Nd | ν |
|---|---|---|---|---|
| 9 | −10.411 | 1.00 | 1.66680 | 33.0 |
| 10 | 9.798 | 2.30 | — | — |
| 11 | −90.680 | 3.00 | 1.77250 | 49.6 |
| 12 | −12.743 | 0.50 | — | — |
| 13 | 14.637 | 4.20 | 1.69350 | 53.2 |
| 14 | 32.862 | 8.03 | — | — |
| 15 | −94.999 | 4.50 | 1.77250 | 49.6 |
| 16 | −33.424 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 |
|---|---|---|---|
| 3 | 0.00 | $-0.55000 \times 10^{-5}$ | $0.41000 \times 10^{-8}$ |

| Surf. No. | A8 | A10 |
|---|---|---|
| 3 | $0.40000 \times 10^{-12}$ | $0.19000 \times 10^{-14}$ |

Embodiment 3

FIG. 7 is the lens arrangement of the relay finder optical system according to the third embodiment of the present invention. FIGS. 8A through 8D show aberrations occurred in the lens arrangement shown in FIG. 7. FIGS. 9A through 9H show transverse aberrations (coma) occurred in the lens arrangement shown in FIG. 9.

Table 3 shows the numerical data of the third embodiment.

Furthermore, surface No. 1 designates the primary imaging plane 12.

TABLE 3

Fe = 1:3.2
f = 30.48
M = −0.25
fB = 5.10

| Surf. No. | r | d | Nd | ν |
|---|---|---|---|---|
| 1 | ∞ | 2.000 | 1.49176 | 57.4 |
| 2 | ∞ | 2.000 | — | — |
| 3* | 90.000 | 10.500 | 1.49176 | 57.4 |
| 4 | ∞ | 0.300 | — | — |
| 5 | ∞ | 102.080 | 1.51633 | 64.1 |
| 6 | ∞ | 1.500 | — | — |
| 7 | 10.462 | 1.900 | 1.77250 | 49.6 |
| 8 | −128.327 | 2.580 | — | — |
| 9 | −12.393 | 1.000 | 1.68893 | 31.1 |
| 10 | 11.752 | 2.300 | — | — |
| 11 | −36.509 | 3.000 | 1.77250 | 49.6 |
| 12 | −11.995 | 0.500 | — | — |
| 13 | 24.386 | 4.200 | 1.74100 | 52.7 |
| 14 | −107.358 | 7.490 | — | — |
| 15 | −37.538 | 4.500 | 1.77250 | 49.6 |
| 16 | −23.830 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 |
|---|---|---|---|
| 3 | 0.00 | $-0.40000 \times 10^{-5}$ | $0.13750 \times 10^{-8}$ |

The numerical values of each condition for each embodiment are shown in Table 4.

TABLE 4

| | Embod. 1 | Embod. 2 | Embod. 3 |
|---|---|---|---|
| Condition (1) | 11.53 | 2.09 | 4.48 |
| Condition (2) | −5.60 | −4.77 | −3.54 |
| Condition (3) | −0.27 | −0.31 | −0.25 |

As can be understood from Table 4, the first through third embodiments satisfy conditions (1) through (3). Furthermore, as can be understood from the aberration diagrams and the lateral aberration diagrams, the various aberrations are adequately corrected.

According to the present invention, a relay finder optical system for an SLR camera with the following features can be obtained, while securing a necessary eye relief, an apparent visual angle, and a finder magnification:

(i) aberrations can be well corrected; and (ii) further miniaturization can be achieved.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A relay finder optical system, of a single-lens reflex camera, comprises a condenser lens group, a prism, and a relay lens group, in this order from a primary imaging plane which is optically equivalent to an imaging plane of the single-lens reflex camera, wherein an image, which is formed on said primary imaging plane, and which is upside down and inverted from left to right, is re-formed on a secondary imaging plane for viewing by a photographer;

wherein said relay lens group comprises a positive front lens group, a negative intermediate lens group, and a positive rear lens group, in this order from an object; and wherein the most photographer's-eye side lens element of said positive rear lens group comprises a positive lens element having a convex surface facing toward the eyes of a photographer, and satisfies the following conditions:

$1 < SF$ $-6 < f/fM < -3$ wherein

SF designates the shaping factor of the most photographer's-eye side positive lens element of said positive rear lens group (SF=(r1+r2)/(r1−r2));

r1 designates the radius of curvature of the object-side surface of the most photographer's-eye side positive lens element of said positive rear lens group;

r2 designates the radius of curvature of the photographer's eye-side surface of the most photographer's-eye side positive lens element of said positive rear lens group;

f designates the focal length of said relay finder optical system; and fM designates the focal length of said negative intermediate lens group.

2. The relay finder optical system of a single-lens reflex camera according to claim 1, wherein said positive rear lens group comprises three separate positive lens elements.

3. The relay finder optical system of a single-lens reflex camera according to claim 1, wherein said negative intermediate lens group comprises a negative biconcave single lens element.

4. The relay finder optical system of a single-lens reflex camera according to claim 1, wherein said positive front lens group comprises a positive single lens element.

5. The relay finder optical system of a single-lens reflex camera according to claim 1, further satisfying the following condition:

$$-0.35 < m < -0.25$$

wherein m designates the lateral magnification of said relay finder optical system.

* * * * *